(12) United States Patent
McGuire et al.

(10) Patent No.: US 6,409,615 B1
(45) Date of Patent: Jun. 25, 2002

(54) GOLF BALL WITH NON-CIRCULAR SHAPED DIMPLES

(75) Inventors: Kenneth Stephen McGuire, Wyoming; Richard Tweddell, III; Peter Worthington Hamilton, both of Cincinnati, all of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 86 days.

(21) Appl. No.: 09/662,861

(22) Filed: Sep. 15, 2000

Related U.S. Application Data

(63) Continuation-in-part of application No. 09/639,362, filed on Aug. 15, 2000, now abandoned, and a continuation-in-part of application No. 09/654,573, filed on Sep. 1, 2000.

(51) Int. Cl.[7] ........................... A63B 37/14; A63B 37/12
(52) U.S. Cl. ....................................... 473/383; 473/384
(58) Field of Search ................................ 473/378, 379, 473/380, 381, 382, 383, 384

(56) References Cited

U.S. PATENT DOCUMENTS

| | | | |
|---|---|---|---|
| 1,418,220 A | * | 5/1922 | White |
| 1,681,167 A | * | 5/1928 | Beldam |
| D79,458 S | * | 9/1929 | Rosiers |
| 4,653,758 A | | 3/1987 | Solheim |
| 4,729,861 A | | 3/1988 | Lynch et al. |
| 4,804,189 A | | 2/1989 | Gobush |
| 4,830,378 A | | 5/1989 | Aoyama |
| 4,869,512 A | | 9/1989 | Nomura et al. |
| 4,915,390 A | | 4/1990 | Gobush et al. |
| 4,948,143 A | | 8/1990 | Aoyama |
| 4,960,281 A | | 10/1990 | Aoyama |
| 4,991,852 A | | 2/1991 | Pattison |
| 5,044,638 A | | 9/1991 | Nesbitt et al. |
| 5,143,377 A | | 9/1992 | Oka et al. |
| 5,174,578 A | | 12/1992 | Oka et al. |
| 5,190,294 A | | 3/1993 | Oka |

(List continued on next page.)

OTHER PUBLICATIONS

"What You Should Know About a Golf Ball's Dimples", by Scott Kramer, Golf Magazine, Aug. 2000, pp. 75–76.
"Porous Cellular Ceramic Membranes: A Stochastic Model to Describe the Structure of an Anodic Oxide Membrane", by J. Broughton & G.A. Davis, Journal of Membrane Science, vol. 106 (1995), pp. 89–101.
"Computing the n–dimensional Delaunay Tessellation with Application to Voronoi Polytopes", by D.F. Watson, The Computer Journal, vol. 24, No. 2 (1981) pp. 167–172.
"Statistical Models to Describe the Structure of Porous Ceramic Membranes", by J.H.F. Lim, X. Jia, R. Jafferali, & G.A. Davies, Separation Science and Technology, 28 (1–3) (1993), pp. 821–854.

*Primary Examiner*—Paul T. Sewell
*Assistant Examiner*—Nini Legesse
(74) *Attorney, Agent, or Firm*—Peter D. Meyer

(57) ABSTRACT

In a non-limiting exemplary embodiment of the present invention, a golf ball has a surface comprising a plurality of dimples arranged in an amorphous pattern. In an additional embodiment of the invention, a golf ball has a surface comprising a plurality of spaced dimples, wherein the dimples each comprise a non-circular shape and are spaced by land portions having substantially uniform widths. In an additional embodiment of the present invention, a golf ball has a surface formed with a plurality of non-circular, multi-sided shaped dimples and interposed lands having substantially consistent widths between adjacent dimples. In yet another alternative embodiment of the present invention, an exemplary method of making a golf ball having a dimpled surface is provided. The process comprises generating an amorphous pattern of non-circular shaped dimples and then transferring the amorphous pattern to the surface of the golf ball.

21 Claims, 8 Drawing Sheets

U.S. PATENT DOCUMENTS

| | | |
|---|---|---|
| 5,201,523 A | 4/1993 | Miller |
| 5,338,039 A | 8/1994 | Oka et al. |
| 5,356,150 A * | 10/1994 | Lavallee et al. |
| 5,377,989 A | 1/1995 | Machin |
| 5,503,398 A | 4/1996 | Lu |
| 5,653,648 A | 8/1997 | Thurman |
| 5,688,193 A | 11/1997 | Kasasima et al. |
| 5,688,194 A | 11/1997 | Stiefel et al. |
| 5,720,675 A | 2/1998 | Shimosaka et al. |
| 5,735,756 A | 4/1998 | Stiefel et al. |
| 5,772,532 A | 6/1998 | Stiefel et al. |
| 5,836,832 A | 11/1998 | Boehm et al. |
| 5,842,937 A | 12/1998 | Dalton et al. |
| D408,483 S * | 4/1999 | Stiefel |
| 5,890,975 A | 4/1999 | Stiefel |
| 5,902,193 A | 5/1999 | Shimosaka et al. |
| 5,957,786 A | 9/1999 | Aoyama |
| 5,965,235 A | 10/1999 | McGuire |
| 5,984,807 A | 11/1999 | Wai et al. |
| 5,997,418 A | 12/1999 | Tavares |
| 6,019,688 A | 2/2000 | Sullivan |
| 6,290,615 B1 | 9/2001 | Ogg |
| D449,358 S * | 10/2001 | Ogg |

\* cited by examiner

GOLF BALL WITH NON-CIRCULAR SHAPED DIMPLES

This is a continuation-in-part of applications, Ser. No. 09/639,362, entitled GOLF BALL WITH NON-CIRCULAR SHAPED DIMPLES, filed on Aug. 15, 2000, now abandoned, and Ser. No. 09/654,573, entitled GOLF BALL WITH NON-CIRCULAR SHAPED DIMPLES, filed on Sep. 1, 2000.

FIELD OF INVENTION

The present invention relates to a golf ball with an improved amorphous pattern of non-circular shaped dimples that provides enhanced performance. A method for generating such a dimple pattern using a constrained Voronoi tessellation on the surface of a ball is also presented.

BACKGROUND OF INVENTION

Dimples are provided in the surface of a golf ball to improve the aerodynamic characteristics and flight distance of the ball. The primary purpose for employing dimples is to reduce the in flight drag on the golf ball, thereby increasing the distance the golf ball can travel. In particular, drag is the air resistance that acts on the golf ball in an opposite direction to the ball's flight. Essentially, as the ball travels through the air, the dimples create turbulence in front of the ball, which reduces the pressure differential between the front and the rear of the ball. As a result, a high degree of dimple coverage is desirable due to the increased turbulence created, which consequently reduces the drag on the ball and improves the distance the ball can travel.

Nonetheless, a high degree of dimple coverage is beneficial to flight distance only if the dimples are of reasonable and relatively uniform size and the spacing, or land portion, between dimples is substantially uniform. Smaller dimples have been found to be not as effective in creating turbulence as larger dimples, and larger size dimples ineffectively maximize the fixed turbulence creating space (i.e. the surface of the golf ball). Similarly, substantially uniform land portions between dimples may also be desirable because too thin a land portion may create manufacturing problems and too large a land portion may ineffectively maximize the surface area of dimples on the ball. Moreover, large variations in dimple size or land portions may negatively affect the aerodynamic properties of the ball. Consequently, it would be desirable to maximize the surface area of dimples on a golf ball with reasonable and relatively uniform sized dimples.

Additionally, it should also be noted that a random dimple pattern on a golf ball's surface should result in lower drag than a golf ball having a non-random dimple pattern. For example, it has been shown, (for example in U.S. Pat. No. 4,960,281 to Aoyama) that drag on a golf ball can be reduced by eliminating the linear alignment of the sides of any three dimples on the surface of a golf ball. In other words, the alignment of the sides of any three dimples on a golf ball reduces the air turbulence created in front of the ball, which results in increased drag when the ball is in flight. Consequently, it would be advantageous if the pattern of dimples on a golf ball were random, or at least if the sides of any three adjacent dimples on the surface of a golf ball were not linearly aligned.

It is also known to provide a golf ball with non-circular dimples, as evidenced by patents to Tavares (U.S. Pat. No. 5,997,418), Machin (U.S. Pat. No. 5,377,989) and Lu (U.S. Pat. No. 5,503,398). A typical drawback with the dimples in these examples is that the dimple patterns do not meet the spherical symmetry standard as required by The United States Golf Association (U.S.G.A.). Spherical symmetry requires that no matter the positioning of a golf ball prior to striking, there may not be variations in performance when the ball is struck in a similar fashion. Similarly, variations in spherical symmetry may also affect the trajectory or roll of a golf ball when in a putting situation. As a result, it would be desirable to offer a non-circular dimpled pattern that complies with the spherical symmetry standard set forth by the U.S.G.A.

In sum, it would be advantageous to have a golf ball or a method of making a golf ball having a high degree of dimple coverage due to the increased turbulence created by the dimple pattern. Moreover, it would be advantageous to maximize the surface area of a golf ball with reasonable and relatively uniform sized dimples and land portions, and to provide a dimple pattern where the sides of any three adjacent dimples are not linearly aligned. Lastly, it would be advantageous to offer such a non-circular dimpled pattern that complies with the spherical symmetry standard set forth by the U.S.G.A.

SUMMARY OF THE INVENTION

In a non-limiting exemplary embodiment of the present invention, a golf ball has a surface comprising a plurality of dimples arranged in an amorphous pattern. In an additional embodiment of the invention, a golf ball has a surface comprising a plurality of spaced dimples, wherein the dimples each comprise a non-circular shape and are spaced by land portions having substantially uniform widths. In an additional embodiment of the present invention, a golf ball has a surface formed with a plurality of non-circular, multi-sided shaped dimples and interposed lands having substantially consistent widths between adjacent dimples. In yet another alternative embodiment of the present invention, an exemplary method of making a golf ball having a dimpled surface is provided. The process comprises generating an amorphous pattern of non-circular shaped dimples on the surface of the golf ball.

One advantage of certain embodiments of the present invention is that the golf ball should be provided with a high degree of dimple coverage, which should improve the flight distance of the ball. Similarly, the amorphous pattern on the surface of the golf ball should allow the surface area of the ball to be maximized with reasonable and relatively uniform sized dimples and land portions. Additionally, the amorphous dimple pattern on the surface of the ball should prevent the linear alignment of any three sides of adjacent dimples, which should also improve the flight distance of the golf ball. Finally, the golf ball's non-circular dimple pattern should comply with the spherical symmetry standard set forth by the U.S.G.A.

Still other advantages and novel features of the present invention will become apparent to those skilled in the art from the following detailed description, which simply illustrates various modes contemplated for carrying out the invention. As will be realized, the invention is capable of other different obvious aspects, all without departing from the invention. Accordingly, the drawings and descriptions are illustrative in nature and not restrictive.

BRIEF DESCRIPTION OF THE DRAWINGS

While the specification concludes with claims particularly pointing out and distinctly claiming the present invention, it is believed that the same will be better understood from the following description, taken in conjunction with the accompanying drawings, in which:

DETAILED DESCRIPTION OF EXEMPLARY EMBODIMENTS

Reference will now be made in detail to various exemplary embodiments of the invention, several of which are also illustrated in the accompanying drawings, wherein like numerals indicate the same element throughout the views.

Figure 1:
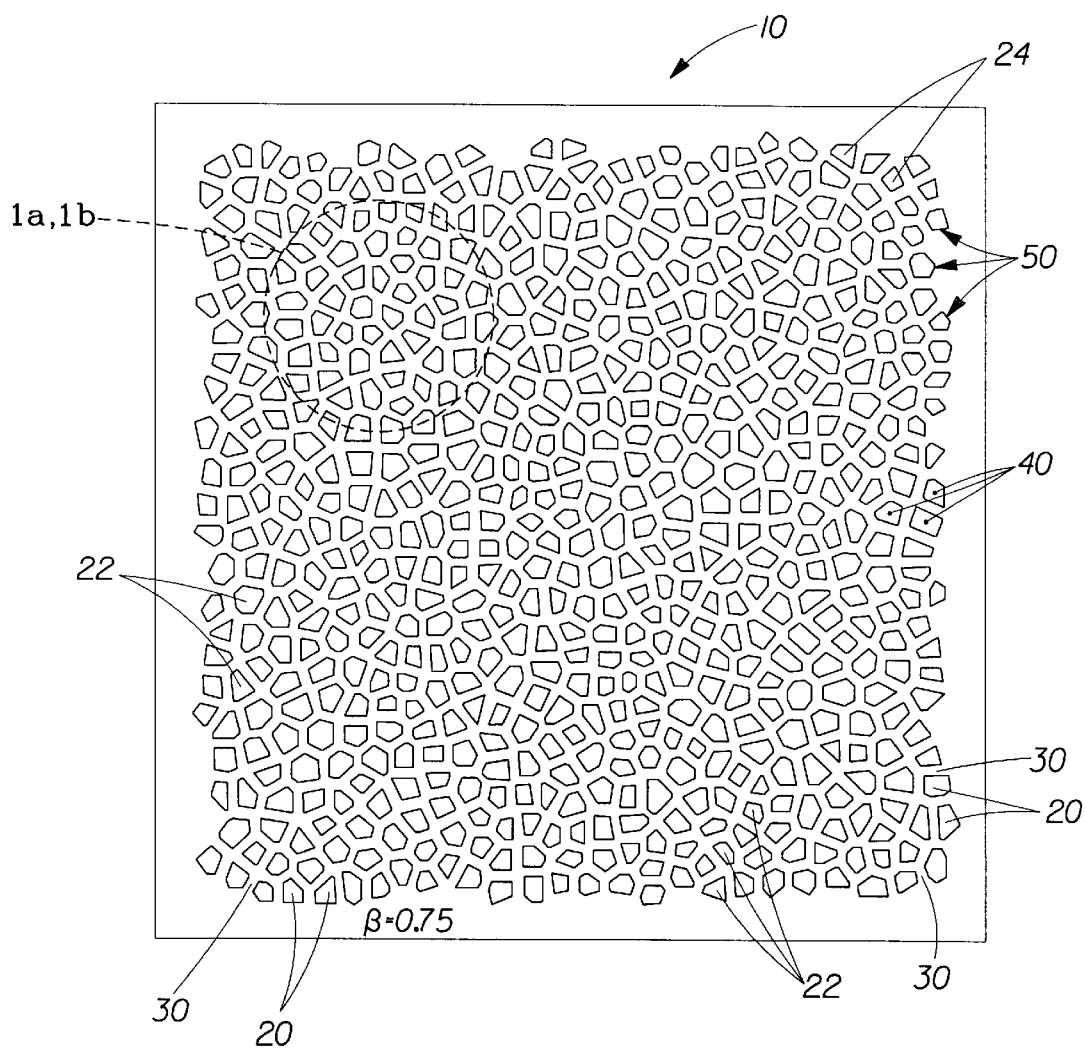
FIG. 1 depicts an exemplary embodiment of a golf ball dimple pattern made in accordance with the present invention.
Figure 1A:
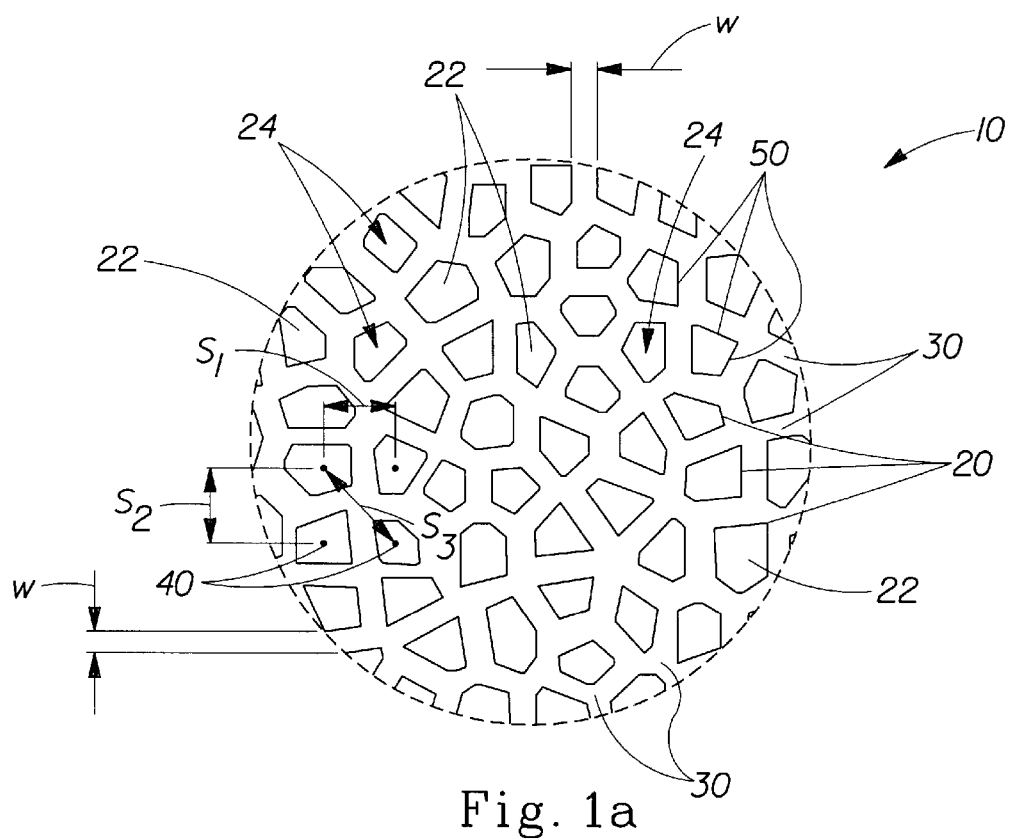
FIGS. 1a and 1b are exploded views of FIG. 1.

FIG. 1 and 1a, an exploded view of FIG. 1, depict a specific embodiment of an exemplary golf ball dimple pattern 10 in accordance with the present invention. The dimple pattern 10 comprises dimples 20 in the surface of a golf ball separated by interposed land portions 30, which defines the width "w" between adjacent dimples 20. As will be observed, in an amorphous dimple pattern, the arrangement and shape of one dimple 20 with regard to a neighboring dimple 20 is random. In other words, the arrangement and shape of one dimple 20 with regard to a neighboring dimple 20 bears no predictable relationship to that of adjacent or succeeding dimple(s) beyond. In addition, the orientation, size, spacing and/or other characteristics of one dimple 20 with regard to a neighboring dimple 20 within an amorphous dimple pattern are also preferably random.

In an exemplary amorphous dimple pattern 10, the physical geometrical characteristics of each dimple 20 is preferably random, such as the shapes of the dimples, the width of the land portions 30 between dimples, the arrangement of each dimple, etc. Moreover, the center 40-to-center 40 dimple spacing is preferably random, at least within a designer-specified bounded range, such that there is an equal likelihood of the nearest neighbor to a given dimple 20 occurring at any given angular position on the surface of the ball 60. Wherein the center of each dimple is defined by a point that is equidistant or at the average distance from all points on the sides. In other words, as illustrated in FIG. 1a, the distance between any two adjacent dimple centers, denoted $S_1$, $S_2$ and $S_3$, is preferably random.

As further shown in FIG. 1a, each dimple 20 can be either a depression 22 or a protuberance 24, and the pattern of dimples 10 can contain any combination thereof. A dimple that is depressed is concave to the surface of the golf ball and conversely, a dimple that is a protuberance is convex to the surface of the ball. Examples of dimples 20 include, but are not limited to, amoeba shapes, curvilinear shapes, such as circles or semi-circles, or polygonal shapes, such as triangles, quadrilaterals, pentagons, hexagons, etc.

Figure 2:
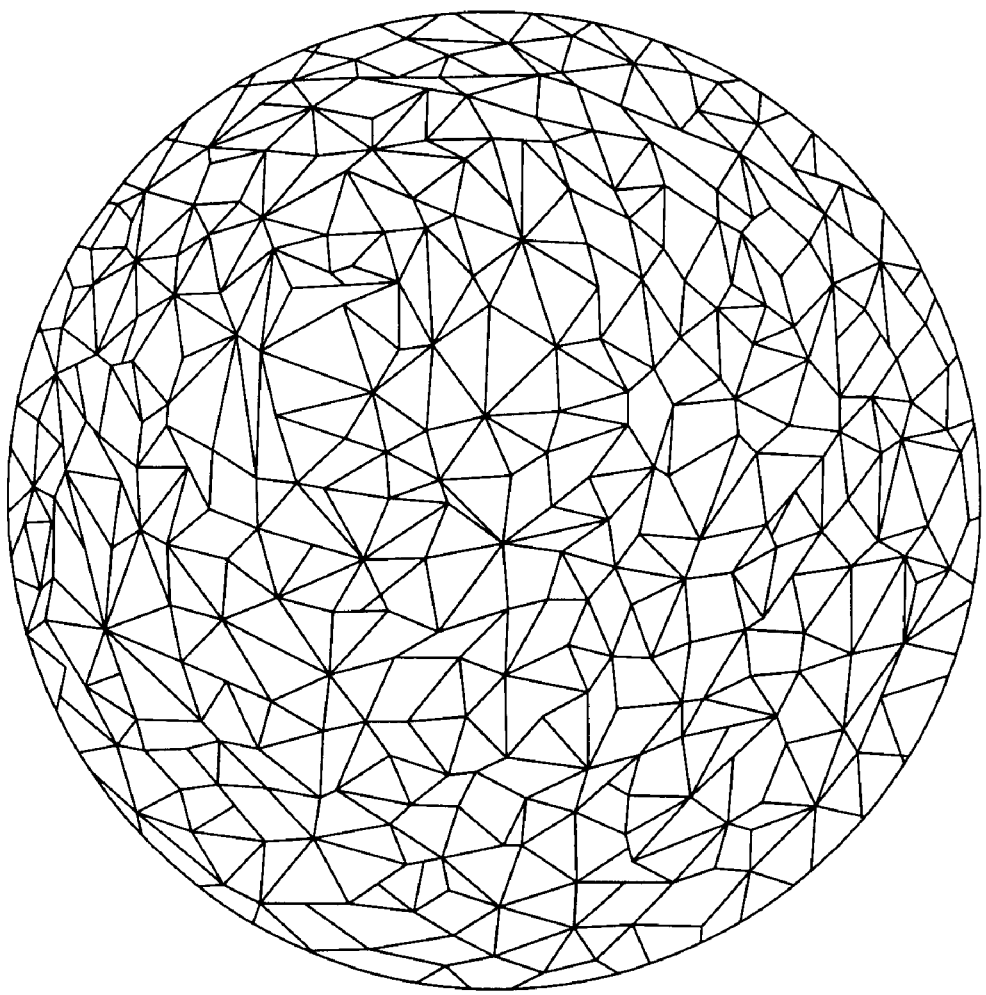
FIG. 2 depicts another dimple pattern in accordance with the present invention as applied to the outer surface of a golf ball.

In an alternate embodiment of the invention, each dimple further comprises three or more identifiable sides 50, defined by changes in periphery direction. A side is identifiable if it is linear in nature. As illustrated in FIG. 2, the use of non-circular shaped dimples 20 having sides 50 forms the basis for maximizing the dimple coverage on the surface of a golf ball 60. In particular, non-circular shaped dimples 20 arranged in an amorphous pattern can have an intermeshing relationship, which increases the amount of surface area the dimples 20 can occupy. In other words, intermeshing dimples 20 can occupy more surface area on the ball than traditionally occupied by golf ball dimple arrangements employing circular or nearly-circular dimple patterns.

Figure 3:
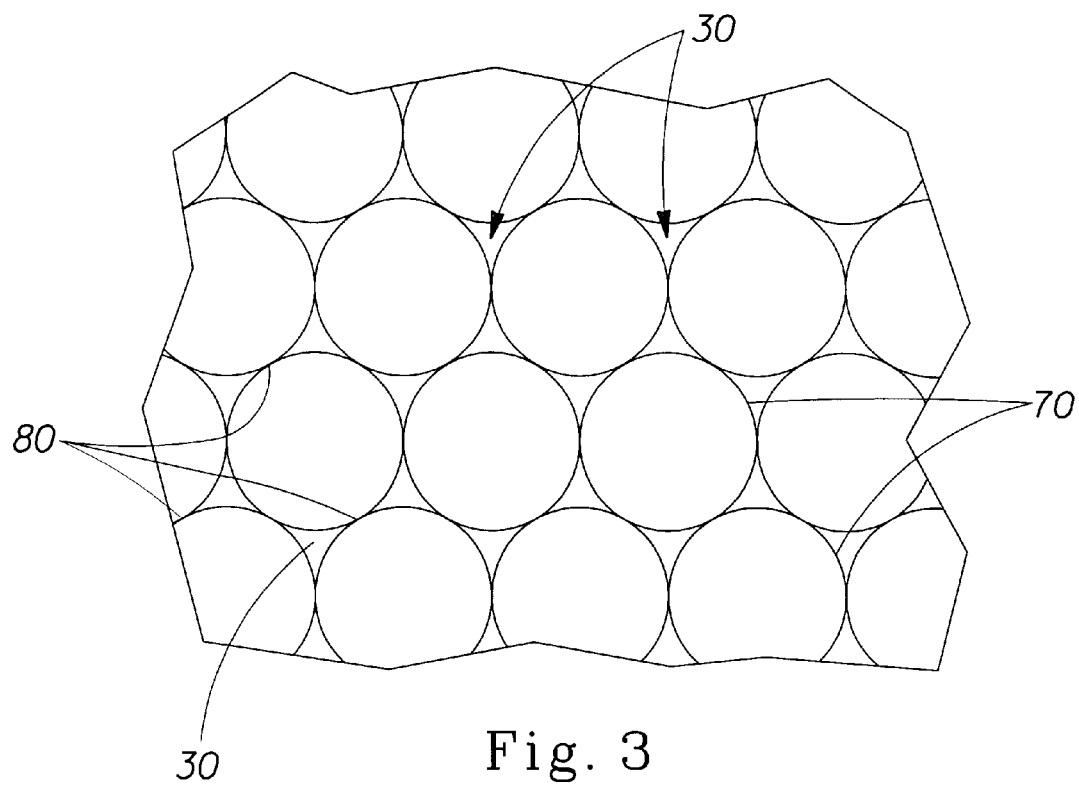
FIG. 3 depicts a prior art golf ball with circular shaped dimples.
Figure 4:
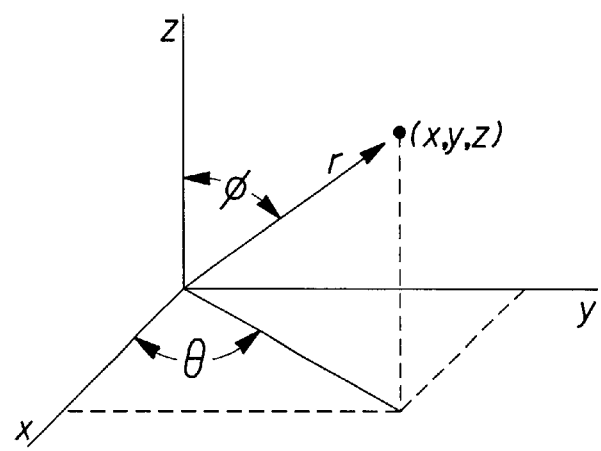
FIG. 4 depicts a spherical coordinate system.

For example, as shown in FIG. 3, prior art dimple patterns employing closely-packed circular shaped dimples 70 are limited in terms of the amount of area the circular shaped dimples 70 can occupy relative to the non-dimpled land portions 30 between the circular shaped dimples 70. More specifically, even in a pattern where adjacent circular shaped dimples 70 nearly touch at a point of tangency 80 there will still be a given width of land 30 separating each dimple and "trapped" between consecutive points of tangency 80. Accordingly, even amorphous patterns of circular shaped dimples 70 are limited in terms of how little land 30 can be designed into the golf ball's dimple pattern.

Conversely, intermeshing non-circular shaped dimples 20 can be designed to pack more closely together to reduce the width of the land portions 30 adjacent to each dimple 20. In essence, non-circular shaped dimples 20 allow a designer to maximize the dimple coverage on the surface of a golf ball by reducing the land portion 30 located between adjacent dimples. In theory, adjacent dimples 20 can nearly be in contact along the entire length of each side 50 such that there is virtually no land portion 30 between each dimple 20. Such a pattern allows for the selective application of a range of non-circular shaped dimple coverage from about 0% to about 100%, which is a significant improvement versus traditional circular patterns which generally encompass from about 50% to about 80% of a golf ball's surface. Consequently, the present invention allows for a high degree of dimple coverage, which is particularly desirable to reduce drag on the golf ball while it is in flight.

In a ball with an amorphous dimple pattern 10 of the present invention, any selected subset of an adjacent plurality of dimples 20 should be unique within the scope of the dimple pattern 10. Moreover, any selected subset of adjacent dimples on the surface of a golf ball should be unique relative to any other adjacent subset of adjacent dimples. The uniqueness of the dimples being defined by the arrangement and shape of the dimples within the selection. In addition, the size, spacing, orientation and/or other characteristics of the dimples within the selection should also preferably be unique.

Figure 1B:
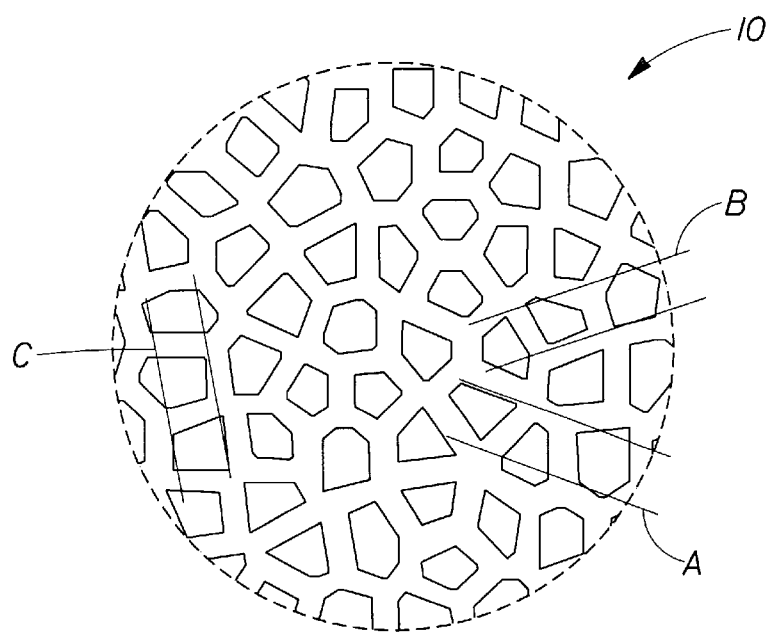

Additionally, it should be noted that the unique nature of the amorphous dimple should result in lower drag on a golf ball than a golfball having a non-random dimple pattern, or at least, should virtually eliminate the possibility of the sides 50 of any three adjacent dimples 20 from being in linear alignment. In other words, as illustrated in FIG. 1b in examples A, B and C, given any three adjacent dimples 20, the identifiable sides 50 are offset such that no three dimples have sides 50 that align due to variations in dimple shape, dimple arrangement and other related factors. As these examples show, any three dimples are not in linear alignment because each dimples' sides 50 are not defined along a straight line. Consequently, the drag on a golf ball having an amorphous dimple pattern should be less than the drag on a golf ball having a non-amorphous pattern.

One of the problems associated with the application of non-circular dimples to golf balls 20 is that, typically, the dimple patterns do not result in spherical symmetry, as required by The United States Golf Association (U.S.G.A.). Such variation is not allowed by current U.S.G.A. rules, and so is undesirable in any commercial golf ball product. In other words, depending on the positioning of the golf ball 60 prior to striking, there may be variations in performance when the ball 60 is struck in a similar fashion. Moreover, variations in spherical symmetry may also affect the trajectory or roll of a ball when putting on a putting surface. Deviations of this type should not be the case in the present invention because dimple patterns that are substantially amorphous in nature are believed to exhibit "isomorphism".

The term "isomorphism" refers to substantial uniformity in geometrical properties for a given selected subset of dimples within the dimple pattern 10. By way of example, a statistically-significant selected subset of dimples 20 with regard to the entire amorphous pattern 10 should yield statistically substantially equivalent values for such properties as the number of dimples, the average area of the dimples, the average size of the dimples, the average spacing between dimples, etc. Such a correlation is believed desirable with respect to physical ball properties because the uniform statistical properties should tend to also assure uniform aerodynamic properties. Consequently, in an embodiment of the present invention, a golf ball exhibits spherical symmetry as defined by the U.S.G.A. and an amorphous dimple pattern 10 should also, in theory, provide the most uniform aerodynamic properties to the ball 60.

In an alternative embodiment of the invention, any non-circular shaped dimple 20, or any area of non-circular shaped dimples may be customized in terms of tailoring a dimple's size, shape, orientation or spacing. Examples of dimple shapes that could further be used in the customization process, but not intended to be exhaustive, are: amoeba shapes; polygonal shapes; curvilinear shapes; or combinations thereof. An example of the customization process may similarly include an embedded pattern of dimples and/or land portions to effectively communicate a brand name, a manufacturer name, or a simple decorative design. For example, a combination of dimples could be arranged on the surface of a golf ball to provide a subtle presentation of logo, etc.

More importantly, however, the present invention also allows for individual 20 to be repeated in a pattern, or for a section of dimple coverage to be repeated on the surface of a golf ball. This may be particularly useful in some instances, where, for example, manufacturing constraints such as for molding a golf ball, may require some minimal land portion 30 between adjacent dimples 20, or, may require one or more great circular paths to be designed in the ball. A great circle path is defined as a circle around a golf ball 60 that does not intersect any dimples 20 and the customization process would allow a manufacturer to incorporate a great circle path by designing one hemisphere of the golf ball and duplicating that design on the opposite side. Although a manufacturer can manufacture a golf ball 60 without great circle paths, it is typically more expensive due to the increased complexity associated with the process. As a result, although in theory, a totally amorphous pattern of dimples covering the entire surface area of the ball is desirable, in some instances it may not be practical or even attainable. Consequently, an embodiment of the present invention permits the precise tailoring of dimple size, shape, orientation, and spacing within a selected subset of the dimple pattern, or allows a dimple pattern to be repeated.

Finally, it should be noted that any pattern repetition, or deviation from randomness, has the potential to vary flight trajectory or increase the drag on a ball 60. However, such a possibility is minimized when a non-amorphous pattern is encompassed by an amorphous pattern as the present invention allows. For example, as stated, the customization process may require a select few dimples to be modified for purposes of incorporating a great circle path. The modification of these few dimples 20 to a non-amorphous design should not significantly affect the aerodynamic properties of the ball when viewed in light of the amorphous pattern that encompasses the modifications. Once again, a statistically-significant selected subset of dimples 20 with regard to the entire dimple pattern 10 should yield statistically substantially equivalent results as compared to any other selected subset of dimples.

The attributes of the exemplary embodiments of a golf ball 60, as previously described, may be obtained through the use of manual design and manufacturing techniques, or by individually custom-forming the dimples 20 wherein the precise size, shape, and orientation of the dimples 20 is non-uniform and non-repeating, or in essence, random. However, it would be a very complex and time-consuming process to accomplish such a task. Consequently, in an embodiment of the present invention, a more expeditious method has been developed.

In particular, one exemplary method of systematically generating an amorphous dimple pattern 10 is known as a constrained Voronoi tessellation of 2-space, as described in detail in McGuire U.S. Pat. No. 5,965,235, which patent is hereby incorporated herein by reference (herein referred to as the '235 patent). The '235 patent applies a constrained tessellation to sheet material in two-dimensional coordinates, whereas the present invention applies a constrained tessellation to a surface of a golf ball employing a spherical coordinate system. This method not only systematically generates an amorphous dimple pattern 10, but it also permits the precise tailoring of desirable dimple size, shape, orientation and spacing with respect to the ball. Chart 1 illustrates the steps associated with generating an amorphous dimple pattern.

Figure 7A:
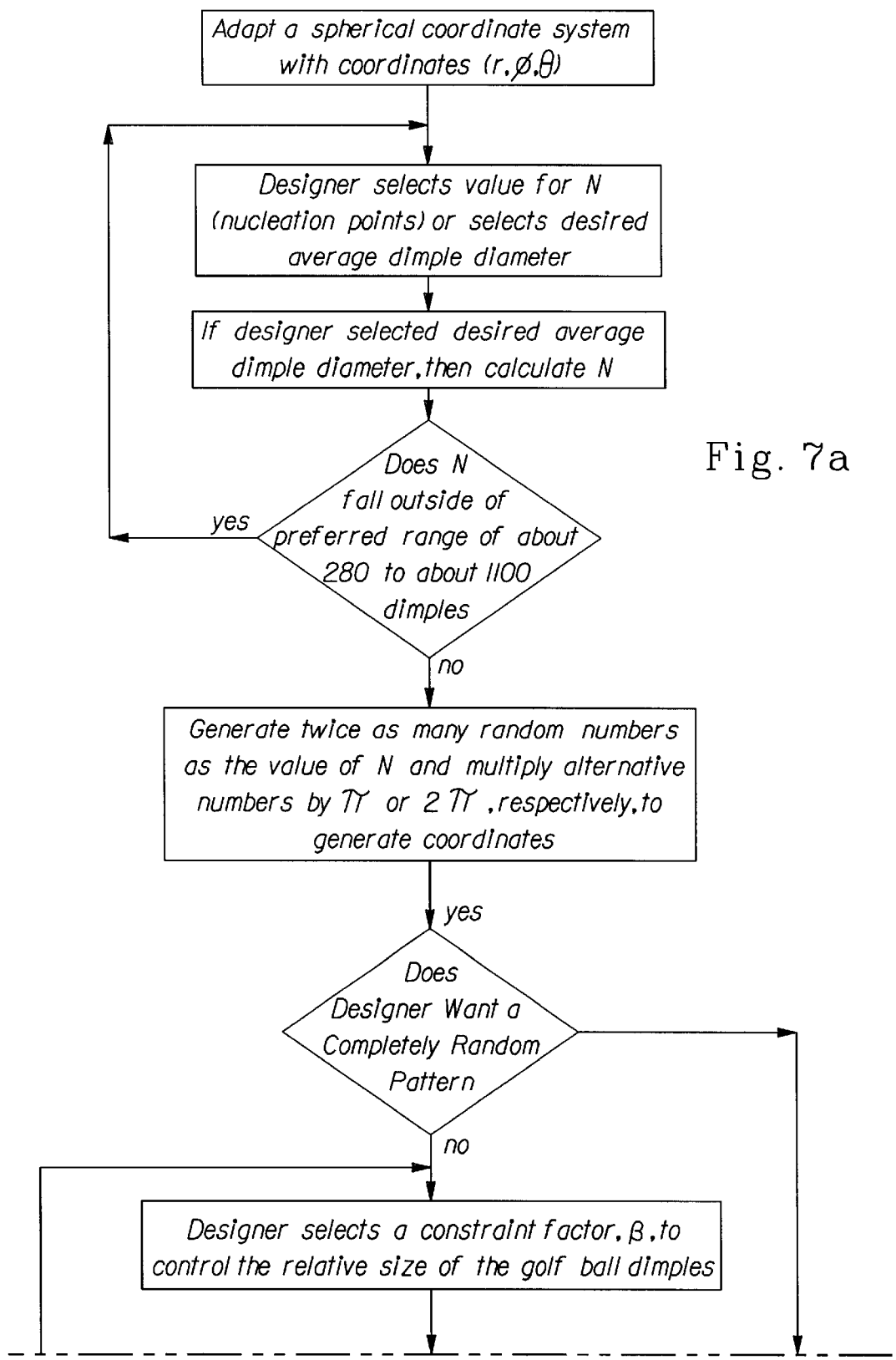
FIGS. 7a and 7b are a representative flowchart depicting an exemplary method for generating an amorphous dimple pattern.
Figure 7B:
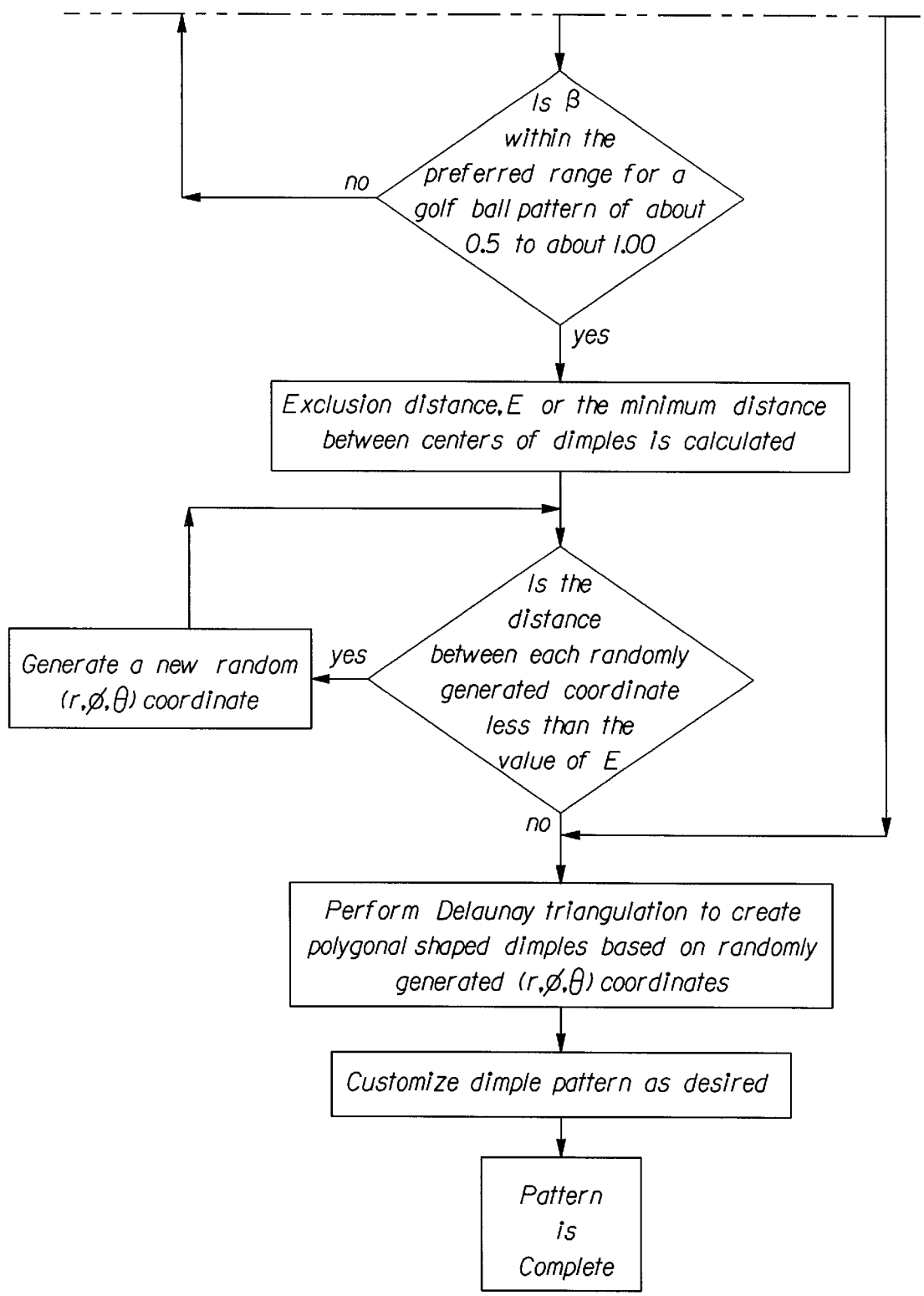

Professor G. A. Davies of the University of Manchester has been studying porous cellular ceramic membranes and, more particularly, has been generating analytical models of such membranes to permit mathematical modeling to simulate real-world performance. This work was described in greater detail in a publication entitled "Porous cellular ceramic membranes: a stochastic model to describe the structure of an anodic oxide membrane", authored by J. Broughton and G. A. Davies, which appeared in the Journal of Membrane Science, Vol. 106 (1995), at pp. 89–101, the disclosure of which is also hereby incorporated herein by reference. Other related mathematical modeling techniques are described in greater detail in "Computing the n-dimensional Delaunay tessellation with application to Voronoi polytopes", authored by D. F. Watson, which appeared in The Computer Journal, Vol. 24, No. 2 (1981), at pp. 167–172, and "Statistical Models to Describe the Structure of Porous Ceramic Membranes", authored by J. F. F. Lim, X. Jia, R. Jafferali, and G. A. Davies, which appeared in Separation Science and Technology, 28(1–3) (1993) at pp. 821–854, the disclosures of both of which are hereby incorporated herein by reference. As part of this work, Professor Davies developed a two-dimensional polygonal pattern based upon a constrained Voronoi tessellation of 2-space. In such a method, again with reference to the above-identified publication, nucleation points are placed in random positions in a bounded (pre-determined) surface that are equal in number to the number of polygonal shaped dimples 20 desired in the finished pattern. A computer program "grows" each point as a circle simultaneously and radially from each nucleation point at equal rates. As growth fronts from neighboring nucleation points meet, growth stops and a boundary line is formed. These boundary lines each form the side of a polygonal shaped dimple, with vertices formed by intersections of boundary lines. While this theoretical background is useful in understanding how such patterns may be generated and the properties of such patterns, there remains the issue of performing the above numerical repetitions step-wise to propagate the nucleation points outwardly throughout the desired field of interest to completion. Accordingly, to expeditiously carry out this process a computer program is preferably written to perform these calculations given the appropriate boundary conditions and input parameters and deliver the desired output. The first step in generating an amorphous dimple pattern in accordance with the present invention, such as exemplary pattern 10 for a golf ball varies slightly from that described in the McGuire '235 patent. In the '235 patent, the first step established a maximum X dimension and a maximum Y dimension, according to a X-Y Cartesian coordinate system. However, as shown in the exemplary method present in FIGS. 7a and 7b, a spherical coordinate system $(r,\phi,\theta)$ can be adopted due to the spherical nature of a golf ball, where, by definition, $\phi$ ranges from 0 to $\pi$ and $\theta$ ranges from 0 to $2\pi$. The radius, r, is at least 0.84 inches due to a U.S.G.A. requirement that the diameter of a golf ball should not be smaller than 1.68 inches. As a result, because the radius of the ball is a constant, the spherical coordinate system requires only a 2-variable input; $(\phi,\theta)$.

The next step is to determine the number of "nucleation points: N" that will become polygonal shaped dimples 20 on the surface of the golf ball. This number is an integer between 0 and infinity, and should be selected with regard to the average size and spacing of the polygonal shaped dimples 20 desired in the finished dimple pattern 10. A larger value of N corresponds to smaller polygonal shaped dimples 20, and vice-versa. In actuality, a designer has the choice of either selecting a value for N or selecting the desired average diameter of the dimples 20. Once a choice is made, the other number can then be calculated.

For example, since the surface area of a golf ball is fixed at a maximum of about 8.87 in$^2$ (i.e. $4\pi r^2$ where r=0.84 in.) the desired number of polygonal shaped dimples 20 on a golf ball 60 can be correlated with the average diameter of the dimples 20, or vice versa. As shown in Table 1, if a designer chooses a value for N of about 500 dimples, the theoretical maximum average diameter of the dimples 20 on the golf ball will be about 0.15 inches. Conversely, if a designer chooses a theoretical maximum average diameter of the dimples of about 0.13 inches, then the golf ball 60 will have about 670 dimples. The average diameter of the dimples 20 is a theoretical maximum because the width of the land portions 30 between the dimples 20 is assumed to be negligibly small. In other words, Table 1 assumes that the polygonal shaped dimples 20 are packed in such a way that adjacent polygonal shaped dimples 20 are in near contact along the entire length of each side 50 such that the width of the land portions 30 between the adjacent sides 50 approaches zero. However, in practice, assuming manufacturing constraints require some land 30 between adjacent dimples 20, then the average diameter of the dimples will decrease to accomodate for the increase in width of land portions 30.

TABLE 1

| No. of Dimples: N | Max. Avg. Dimple Diameter |
|---|---|
| 1130 | 0.10 in. |
| 934 | 0.11 in. |
| 785 | 0.12 in. |
| 667 | 0.13 in. |
| 576 | 0.14 in. |
| 500 | 0.15 in. |
| 441 | 0.16 in. |
| 391 | 0.17 in. |
| 349 | 0.18 in. |
| 313 | 0.19 in. |
| 282 | 0.20 in. |

Although N or the average diameter of the dimples could be selected any number of ways, for golf balls the selection of N should generally range from about 250 dimples to about 1100 dimples, with most ranging from about 350 dimples to about 600 dimples. These ranges correlate with an average dimple diameter of about 0.20 inches to about 0.10 inches and more preferably from about 0.18 to about 0.14 inches, assuming the width of land portions 30 between the dimples 20 is negligibly small.

The next step requires generating a random number through any suitable random number generator, such as a program or algorithm, known to those skilled in the art, including those requiring a "seed number" or utilizing an objectively determined starting value such as chronological time. Many random number generators operate to provide a number between zero and one [0–1], and the discussion hereafter assumes the use of such a generator. A generator with differing output may also be utilized if the result is converted to some number between zero and one or if appropriate conversion factors are utilized. In one embodiment, a computer program, algorithm or routine can be written to run the random number generator the desired number of iterations to generate as many random numbers as is required to equal twice the desired number of "nucleation points" calculated above. As the numbers are generated, alternate numbers are multiplied by $\pi$, the maximum $\phi$ coordinate, or $2\pi$, the maximum $\theta$ coordinate, to generate random pairs of $\phi$ and $\theta$ coordinates all having $\phi$ values between zero and $\pi$ and $\theta$ values between zero and $2\pi$. These values provide pairs of $(\phi,\theta)$ coordinates equal in number to the number of "nucleation points".

If the method described in the preceding paragraph is utilized to generate a resulting pattern, the pattern will be truly random. This truly random pattern will, by its nature, have a large distribution of polygonal shaped dimple 20 sizes and shapes which may be undesirable in some instances. For example, a large distribution of polygonal shaped dimple sizes may lead to large variations in dimple size, which may undesirably impact a golf ball's spherical symmetry or drag. In particular, smaller dimples are less effective in creating turbulence than larger dimples, and larger size dimples ineffectively maximize the fixed turbulence creating space (i.e. surface of the golf ball). Similarly, substantially uniform widths of land portions 30 may also be desirable because too thin a land portion 30 may create manufacturing problems and too large a land portion 30 ineffectively maximizes the surface area of the golf ball. In particular, land portion 30 located between sides 50 of adjacent dimples may be of differing widths, but each land portion 30 should be substantially uniform or consistent in width as between facing sides of two adjacent dimples. Under such circumstances, the drag on a golf ball should be minimized.

In order to provide some degree of control over the degree of randomness associated with the generation of "nucleation point" locations, and hence, the size of the dimples, a designer can choose a control factor or "constraint" referred to hereafter as β. The constraint limits the proximity of neighboring nucleation point locations through the introduction of an exclusion distance, E, which represents the minimum distance between any two adjacent nucleation points. The exclusion distance E is computed as follows:

$$E = \frac{4\beta r}{\sqrt{N}}$$

where N is the number of "nucleation points", r is the ball radius and β ranges from 0 to 1. To implement the control of the "degree of randomness", the first nucleation point is placed as described above. β is then selected, and E is calculated from the above equation. Note that β, and thus E, will remain constant throughout the placement of nucleation points for a given pattern design. For every subsequent nucleation point (φ,θ) coordinate that is generated, the distance from this point is computed to every other nucleation point that has already been placed. If this distance is less than E for any point, the newly-generated (φ,θ) coordinates are deleted and a new set is generated. This process is repeated until all N points have been successfully placed.

Figure 5:
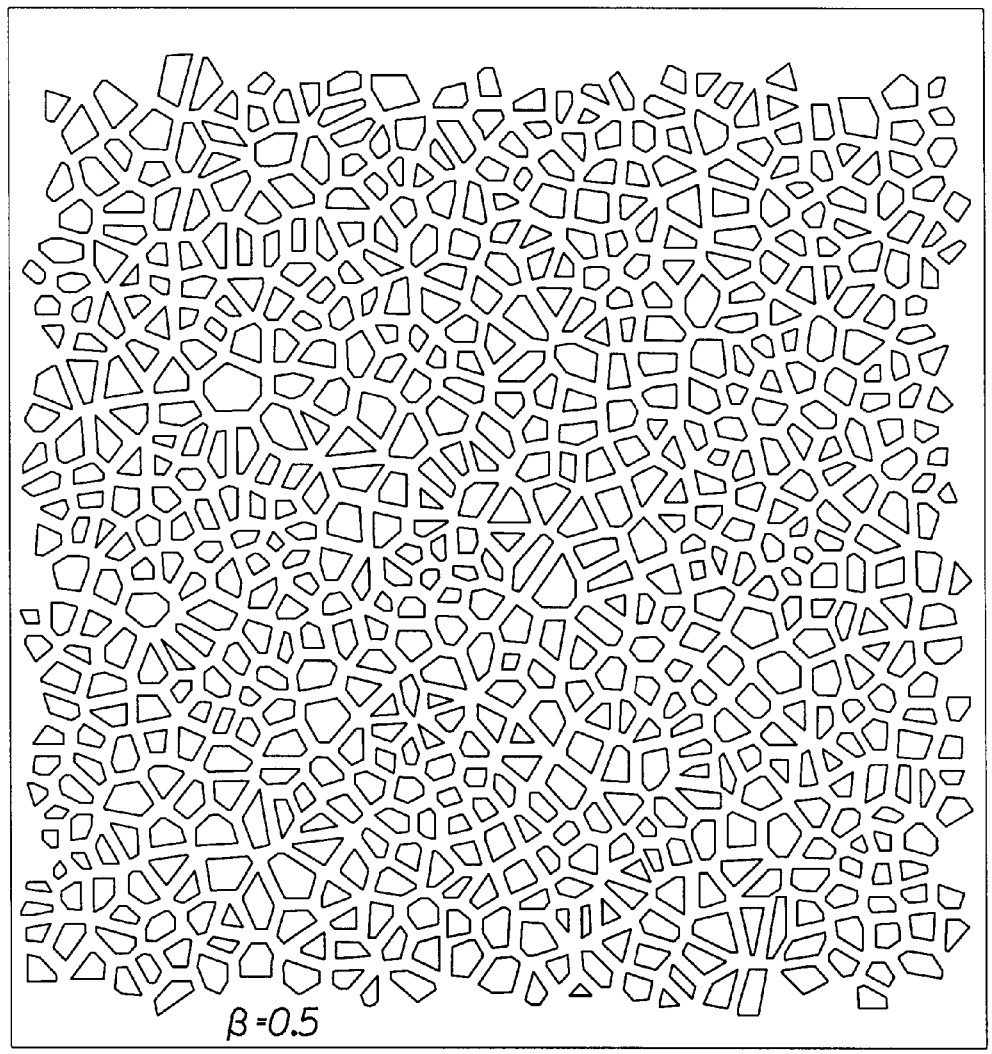
FIGS. 5 and 6 depict further alternate exemplary embodiments of dimple patterns.
Figure 6:
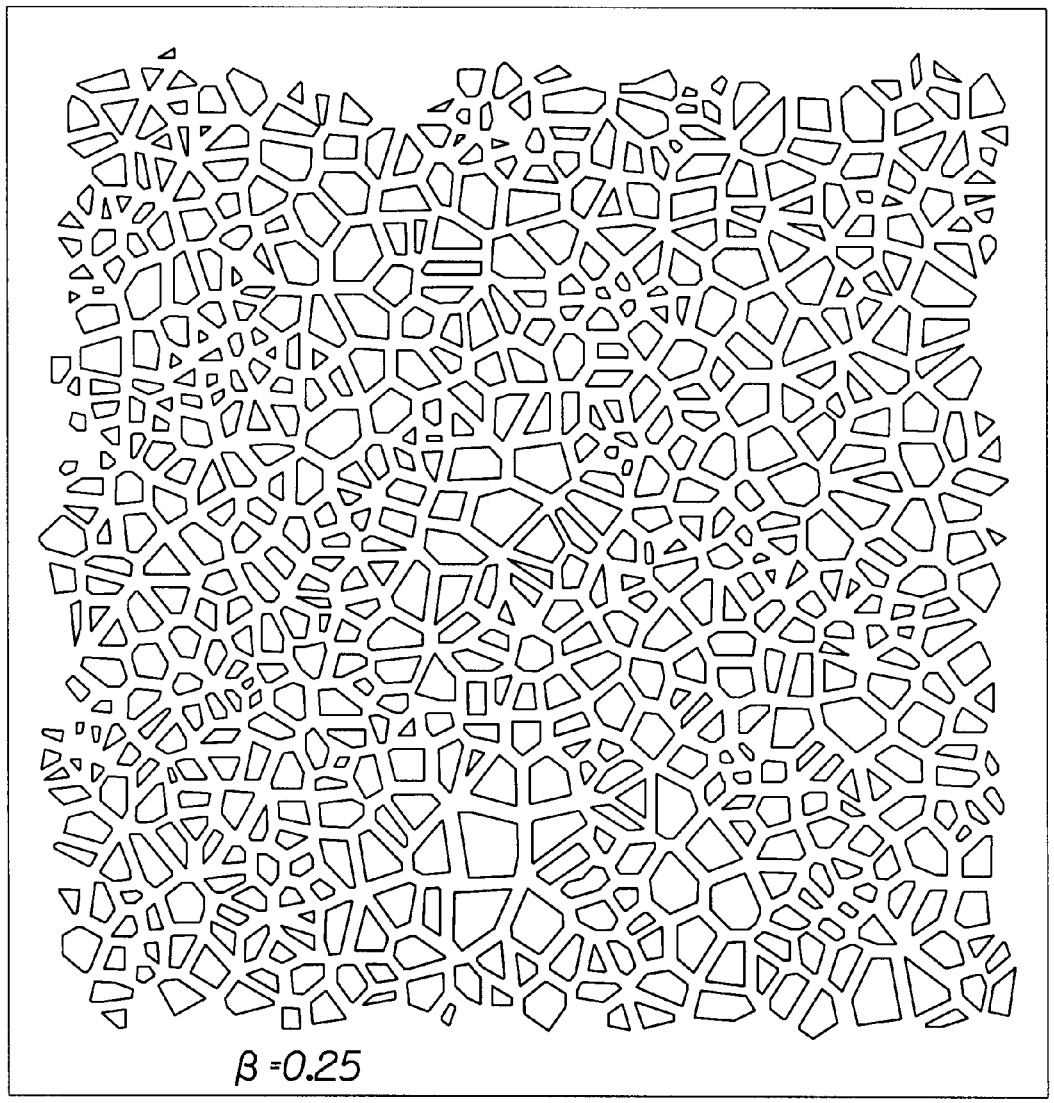

If β=0, then the exclusion distance is zero, and the pattern will be truly random. If β=1, the exclusion distance is equal to the nearest neighbor distance for a hexagonally close-packed array. Selecting β between 0 and 1 allows control over the "degree of randomness" between these two extremes. For example, FIGS. 1, 5 and 6 show an amorphous dimple pattern 10 generated where β=0.75, β=0.50 and β=0.25, respectively. As demonstrated in FIG. 6, where the designer chose a β=0.25, the amorphous dimple pattern 10 has large variations in dimple size 20 between adjacent dimples. In FIG. 5, where β=0.50 the variations in dimple size, orientation and other factors are more uniform. In an alternate and exemplary embodiment of the present invention, the amorphous pattern of FIG. 1, where β=0.75, illustrates a pattern with dimples 20 that are of a reasonable and relatively uniform size, and more optimized, accordingly. Moreover, the width of land portions 30 between adjacent dimples is also substantially uniform or consistent, which is a desirable characteristic associated with golf ball dimple patterns. Finally, a dimple pattern having a β=0.70, is illustrated as it would be applied to an actual golf ball. Consequently, β should be selected from about 0.50 to about 1 and more preferably from about 0.75 to about 1.

Once the complete set of nucleation points are computed and stored, a Delaunay triangulation is performed as the precursor step to generating the finished polygonal shaped dimple pattern 10. The use of a Delaunay triangulation in this process constitutes a simpler but mathematically equivalent alternative to iteratively "growing" the polygonal shapes from the nucleation points simultaneously as circles, as described in the theoretical model above. The triangulation generates sets of three nucleation points forming triangles, such that a circle constructed to pass through those three points will not include any other nucleation points within the circle. To perform the Delaunay triangulation, a computer program, algorithm or routine is written to assemble every possible combination of three nucleation points, with each nucleation point being assigned a unique number (integer) merely for identification purposes. The radius and center point coordinates are then calculated for a circle passing through each set of three triangularly-arranged points. The coordinate locations of each nucleation point not used to define the particular triangle are then compared with the coordinates of the circle (radius and center point) to determine whether any of the other nucleation points fall within the circle of the three points of interest. If the constructed circle for those three points passes the test (i.e. no other nucleation points falling within the circle), then the three point numbers, their (φ,θ) coordinates, the radius of the circle, and the (φ,θ) coordinates of the circle center are stored. If the constructed circle for those three points fails the test (i.e. one or more points falls within the circle), no results are saved and the calculation progresses to the next set of three points. Once the Delaunay triangulation has been completed, a Voronoi tessellation is then performed to generate the finished polygonal shaped dimples 20. To accomplish the tessellation, each nucleation point saved as being a vertex of a Delaunay triangle forms the center of a polygonal shaped dimple 20. The outline of the polygonal shaped dimple is then constructed by sequentially connecting the center points of the circumscribed circles of each of the Delaunay triangles, which include that vertex, sequentially in clockwise fashion. Saving these circle center points in a repetitive order such as clockwise enables the coordinates of the vertices of each polygonal shaped dimple 20 to be saved sequentially throughout the field of nucleation points.

Upon completion of the tessellation, each vertex of a polygonal shaped dimple 20 can be saved, such as by a storage device, as a coordinate in a data file. As a result, once a finished amorphous dimple pattern 10 is generated and saved, in accordance with the present invention, the width of land portions 30 between the polygonal shaped dimples 20 can be added or the designer could customize any individual dimple or set of dimples for size, shape, orientation, or spacing. For example, to increase the width of land portions 30 between polygonal shaped dimples 20, a computer program, routine or algorithm can be written to add one or more parallel lines to each side of the polygonal shaped dimple 20 to increase its width (and hence decrease the size of the polygonal shaped dimple a corresponding amount). Further, although the above method is limited to the generation of a polygonal shaped dimple pattern, a computer program, routine or algorithm could be implemented to generate a pattern incorporating curvilinear shapes, amoeba shapes and polygonal shapes, or any combination therein, according to the present invention.

Finally, after the amorphous dimple pattern 10 has been saved along with any modifications, the pattern could be output to a device for machining a golf ball mold such as a Computer Aided Design/Computer Aided Manufacturing system.

Having shown and described the preferred embodiments of the present invention, further adaptations of a golf ball with an amorphous dimple pattern or a method for generating such a dimple pattern can herein be accomplished by appropriate modifications by one of ordinary skill in the art without departing from the scope of the present invention. Accordingly, the scope of the present invention should be considered in terms of the following claims and is understood not to be limited to the details of structure and operation shown and described in the specification and drawings.

What is claimed is:

1. A golf ball having a surface comprising a plurality of non-circular dimples arranged in an amorphous pattern on said surface and spaced by land portions having substantially uniform widths.

2. A golf ball according to claim 1, wherein any selected subset of adjacent dimples on the surface of a golf ball is unique within the scope of the dimple pattern.

3. A golf ball according to claim 1, wherein any selected subset of adjacent dimples on the surface of a golf ball is unique relative to any other adjacent subset of adjacent dimples.

4. A golf ball according to claim 1, wherein said dimples comprise a plurality of at least one of the following: depressions and protuberances.

5. A golf ball according to claim 1, wherein said amorphous pattern covers up to about 100% of said golf ball's surface.

6. A golf ball according to claim 1, wherein said golf ball pattern is isomorphic.

7. A golf ball having a surface comprising a plurality of spaced dimples, wherein said dimples each comprise a non-circular, amorphous shape and are spaced by land portions having substantially uniform widths.

8. A golf ball according to claim 7, wherein the non-circular shapes of adjacent dimples are unique.

9. A golf ball according to claim 7, wherein said dimples comprise a plurality of at least one of the following: depressions and protuberances on said surface with each dimple further comprising a center and at least three identifiable sides.

10. A golf ball of claim 9, wherein the center-to-center spacing between adjacent dimples is random.

11. A golf ball according to claim 9, wherein the sides of any three adjacent dimples are not in linear alignment.

12. A golf ball having a surface formed with a plurality of amorphous non-circular, multi-sided shaped dimples and interposed lands having substantially consistent widths between adjacent dimples.

13. A golf ball according to claim 12, wherein any selected subset of adjacent dimples is unique from any other adjacent selected subset of dimples.

14. A golf ball according to claim 12, wherein said dimples comprise at least three identifiable sides.

15. A golf ball according to claim 14, wherein at least some of the sides of said dimples are linear in nature.

16. A method of making the golf ball of claim 1 comprising the steps of: generating an amorphous pattern of non-circular shaped dimples; and transferring said pattern onto said ball.

17. The method of claim 16, further comprising using a spherical coordinate system.

18. The method of claim 16, wherein at least some of said non-circular shaped dimples are generated to comprise polygonal shapes.

19. The method of claim 16, wherein said generating step includes deriving said amorphous pattern from a constrained Voronoi tessellation.

20. The method of claim 19, further comprising adoption of a constraint factor to control the range of permissible center-to center spacing between adjacent shapes in said tessellation.

21. The method of claim 16, wherein said generating step includes custom tailoring of at least one of an individual dimple's size, shape orientation and spacing with respect to said ball.

* * * * *